United States Patent [19]

Chang et al.

[11] Patent Number: 5,117,236

[45] Date of Patent: May 26, 1992

[54] ANTENNA PATTERN SELECTION FOR OPTIMIZED COMMUNICATIONS

[75] Inventors: Hungkun J. Chang, Schaumburg; William K. Doss, Mount Prospect; Michael P. Nolan, Lake Zurich; Dale R. Buchholz, Palatine, all of Ill.

[73] Assignee: Motorola, Inc., Schaumburg, Ill.

[21] Appl. No.: 601,476

[22] Filed: Oct. 19, 1990

[51] Int. Cl.⁵ .................. H04B 7/00; H04B 17/02
[52] U.S. Cl. ....................... 342/367; 455/133
[58] Field of Search ............ 342/367, 374; 455/133, 455/134, 135, 25, 31, 33

[56] References Cited

U.S. PATENT DOCUMENTS

| | | | |
|---|---|---|---|
| 2,604,587 | 7/1952 | Lyons | 455/135 |
| 3,781,890 | 12/1973 | Boyer | 342/367 |
| 4,317,229 | 2/1982 | Craig et al. | 455/134 |

Primary Examiner—Gregory C. Issing
Attorney, Agent, or Firm—Val Jean F. Hillman

[57] ABSTRACT

An antenna selection technique is used in an RF communication system in which user modules (UM) communicate with at least one node. The UM's and nodes each have multiple antennae. The combination of each UM and node antenna is evaluated at the UM. Based on both signal quality and strength, the UM selects its antenna and the best node antenna for use.

14 Claims, 5 Drawing Sheets

ANTENNA PATTERN SELECTION FOR OPTIMIZED COMMUNICATIONS

BACKGROUND OF THE INVENTION

This invention generally addresses a communications system in which a plurality of spacially separated devices utilize RF communications and more specifically addresses a method for selecting the best antenna pattern from among several choices of antenna patterns. This invention is especially suited for, but not limited to, an environment in which multipath signals and fading problems are significant such as in an RF communication system located inside a building.

It is generally known that directive antenna patterns can be utilized to enhance RF communications between remote RF transceivers. It is also generally known that various means exist for controlling an antenna radiation pattern such as by rotating a highly directional antenna, controlling the phasing of different antenna elements to electronically steer the primary beam or radiation pattern, and the selection of different directional antennas targeted at different locations.

Methods for selecting an optimal antenna pattern vary greatly depending upon the environment. In microwave line of sight communication applications, the antenna pattern selection is simple: just orient highly directional antennas pointing at each other. Physically separated antennas may be utilized by an RF transceiver to enhance communications that are not line of sight. In such diversity applications each antenna may be monitored with the antenna having the optimal signal being selected for use of all of the antennas may be combined utilizing the proper phasing to generate an enhanced single signal.

A number of factors make the problem of antenna pattern selection difficult. The reception of multipath signals, i.e. receiving the same signal at different times with different signal strengths from different geographic locations, greatly complicates antenna pattern selection. The constant fading of signals also adds to the problem. These factors are present inside a building in which RF transceivers communicate using the 1-20 GHz (gigahertz) frequency range. The relatively close distances between the antennae and reflectors, such as walls, floors, ceilings and other metal objects large relative to the wavelength, result in strong multipath signals. Continuous fading results from environmental changes such as the movement of people. There exists a need for an antenna pattern selection method which optimizes communications in such an environment.

DESCRIPTION OF A PREFERRED EMBODIMENT

Figure 1:
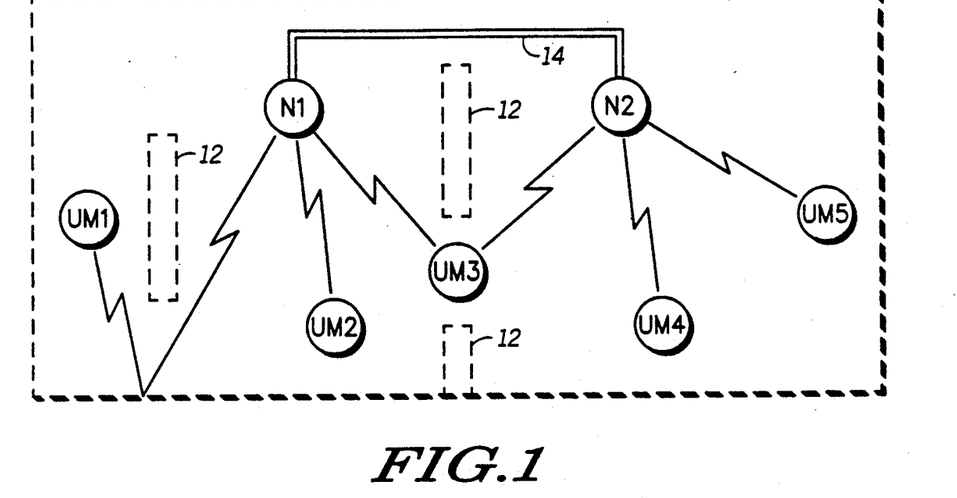
FIG. 1 is a diagram of an RF communication system employing an embodiment of the present invention.

FIG. 1 shows an illustrative RF communications system having nodes N1 and N2, and user modules UM1-UM5. The nodes and user modules each include an RF transceiver enabling each user module (or remote device) to communicate with the nodes. The outside wall of one floor of a building is represented by dashed line 10. Interior walls 12 divide the space into different areas. In the illustrated example, interior walls 12 do not pass RF energy and in practice may constitute moveable metal walls in an office environment.

Node N1 communicates with user modules UM1-UM3. Node N2 communicates the user modules UM3-UM5. Thus, user module UM3 represents a common cell capable of communicating with either node. Node N1 can also communicate directly with Node N2 by wire communication channel 14. Thus, each of the user modules can communicate with any of the other user modules in this system. It should be noted that a user module such as UM1 may not have a line of sight path to any node and thus must utilize a communications path including at least one reflection. It will be apparent to those skilled in the art that UM's with a line of sight communication path to a node will also receive multiple reflected signals.

Figure 2:
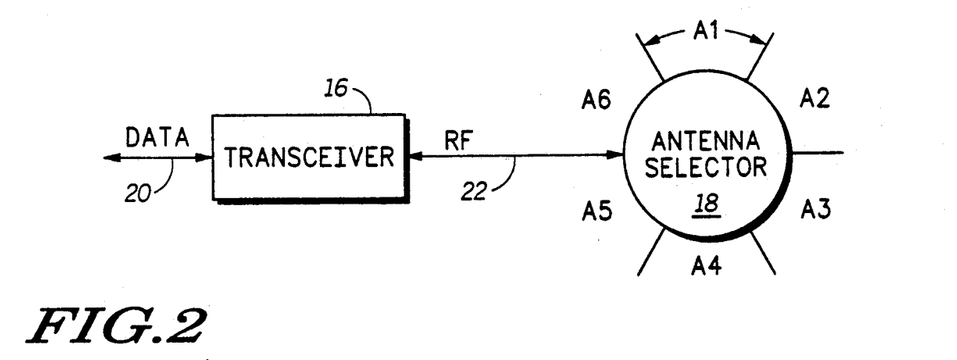
FIG. 2 is a block diagram which shows an exemplary embodiment of an RF transceiver with antenna selection in accord with the present invention.

FIG. 2 illustrates an exemplary embodiment of an RF transceiver 16, an antenna selector 18 and a plurality of selectable directive antennas A1-A6 which maybe used as part of either a node or user module. In this illustrative embodiment six unidirectional antennae with 60 degree beam widths are located in a generally horizontal plane to give 360 degree pattern coverage. A data input/output channel 20 may be coupled to one or more data devices. In the case of a user module, channel 20 could be coupled to a personal computer, an Ethernet port, or a digitized voice source. If utilized as a node, the data input/output channel 20 may consist of a wireline data communications link 14 with other nodes and may also be coupled to other data devices. The transceiver 16 contains a conventional receiver for receiving RF signals including appropriate demodulation and decision making circuitry for decoding received signals into corresponding data. The transceiver also contains an RF transmitter with suitable modulation and encoding circuitry to encode data to be transmitted over the RF carrier. The RF signals transmitted and received by receiver 16 are coupled to antenna selector 18 by cable or waveguide 22.

The antenna selector 18 is capable of selecting any one of the six antennas A1-A6 for use by transceiver 16. In order to rapidly select one of the available antennas, electronic switching is preferably utilized to select the desired antenna. Of course, conventional mechanical switching can be utilized if suitable for the particular application. The antenna selector contains a microprocessor and associated support circuitry for determining which antenna should be utilized as will be explained in detail below. At microwave frequencies, the antenna may constitute horn antennae or other directive antennae and are preferably arranged to provide complete 360 degree coverage in a horizontal plane with appropriate vertical beam widths to provide latitude for the reception of signals from virtually any location relative to the node or user module. It will be apparent to those skilled in the art that the antenna selector 18 may be physically housed within transceiver 16 if desired.

In the illustrated embodiment of the present invention, communications between the nodes and user modules is accomplished using a time division multiple access system in which packets of data are transmitted. The nodes send packets containing an address and other related overhead information along with data destined for a user module which will recognize this information by means of its unique address. Similarly, the user modules transmit messages to a node addressed for the node itself or another user module. Part of the information transmitted by each node is the periodic transmission of reference packets which are received by the user modules. The bit error rate or other merit factor associated with the reception of the reference packets along with the signal strength is utilized in the antenna selection process which will be described below.

Figure 3:
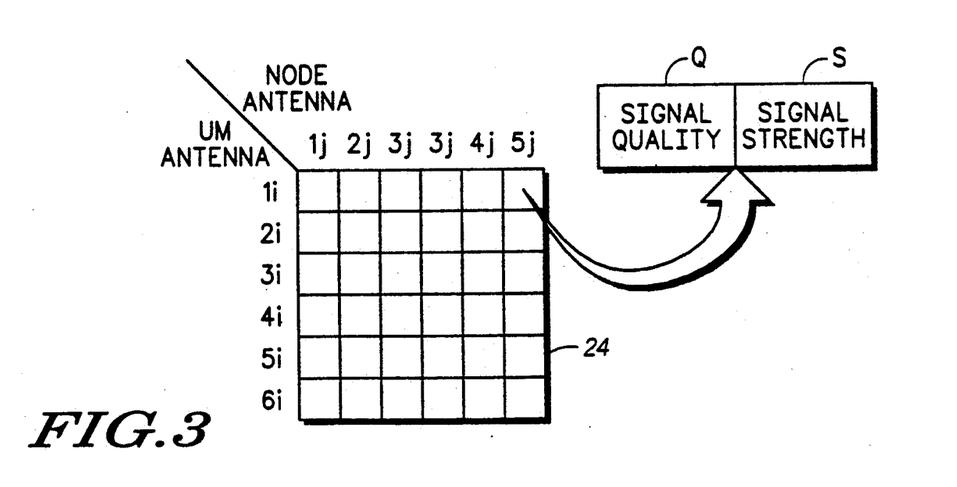
FIG. 3 is a table illustrating different antenna performance measurements made in accordance with an embodiment of the present invention.

In FIG. 3 Table 24 consists of a matrix of numerical values which reflect a ranking of the antenna patterns, i.e. different antenna in this embodiment. A separate value is calculated for each of the combinations of antennas for a user module and a node, i.e. user module antennas $1i$-$6i$ and node antennas $1j$-$6j$. In the illustrative embodiment, each user module maintains such a matrix for each node with which it can communicate. In the system as shown in FIG. 1, UM3 would maintain a separate matrix for N1 and N2; the other UM's would maintain a single matrix for the respective nodes.

Each user module generates a Table for each node with which it can communicate upon being put into service in such a system. In this system nodes and user modules utilize half duplex communications by sending information to each other. User modules preferably generate the values for the matrix based upon data received from each node. The node transmits the reference packets of data periodically using each of its antennas $1j$-$6j$ and the user module receives the transmitted signals by periodically selecting each of its antennas $1i$-$6i$. Thus, after 36 such communications Table 24 will have values for each cell. In a relatively high speed communications system, such as utilizing packet transmission techniques, transmitting and receiving the required reference signals to complete the Table can be accomplished in a relatively short time.

The calculation of the value for each cell in Table 24 is based on signal Quality (Q) and signal Strength (S) of the reference signal received by a user module antenna from a node antenna. Each received reference signal has a new rank (R) calculated as follows:

$$R = (q*Q) + (s*S) \qquad (1)$$

where q and s represent numerical weighting factors allowing the signal quality to be weighted differently than the signal strength. The selection of each of these weighting factors will be somewhat dependent upon the communications system and the anticipated environment. In a preferred embodiment of the present invention, the signal quality has a substantially greater importance than the signal strength and thus q>>s, i.e. q>10s. A conventional RF signal level sensing measurement may be utilized for signal strength. The signal quality may be measured by determining how many transmitted symbols exceed a predetermined receiver demodulation window or may be based upon other known signal quality type measurements such as bit error rate.

The historical rank (HR) of the signal for each cell in the matrix is the value stored in Table 24 and may be determined as follows:

$$HR = (k*HR) + ((1-k)*R) \qquad (2)$$

Where k is a weighting factor which weights the historical rating HR relative to a newly calculated new rating R, where 1>k>0. In the preferred embodiment the historical rank is weighted substantially higher than the new rank to prevent rapid changes in the cell value, i.e. k>0.5 such as k=0.9. This places more emphasis on the past history than on the current calculation. This does not introduce an excessive delay in selecting a different antenna when the table HR values are updated frequently, such as every 24 milliseconds. As will be described in more detail below, at least portions of this Table are being continually updated to take into account a changing environment or other factors.

After each user module completes a Table 24 for each of the nodes with which it can communicate, the user module makes a determination of the best node antenna. This determination is transmitted from the user module to each respective node thereby informing the node which of its antennas to use when communicating with the user module. The user module antenna to be utilized for each node is selected at the user module based upon the Table. Since the Table at the user module is based upon signals received from a node, it will be apparent to those skilled in the art that this system relies upon the principal of reciprocity in making the node antenna selection, i.e. it is assumed that the best antenna for transmitting from the node to the UM is also the best antenna for receiving signals from the user module. The antenna selection method according to the present invention allows additional user modules to be installed subsequent to initial system configuration with automatic reconfiguration and selection of the best antenna choices.

Figure 4:
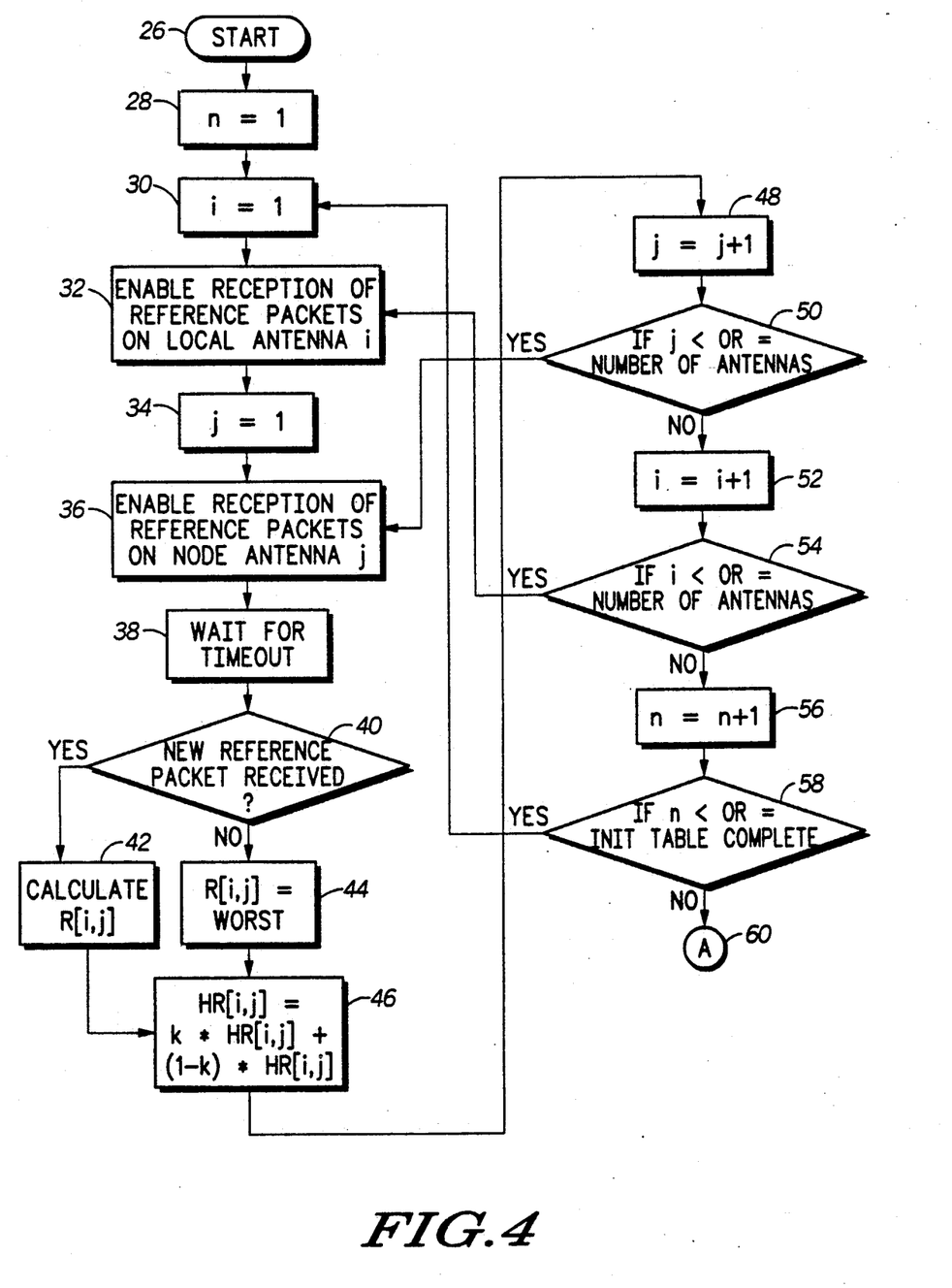
FIG. 4 is a flow diagram illustrating an embodiment of a method in accordance with the present invention for generating the initial performance measurements used in the table shown in FIG. 3.

FIG. 4 is a flow diagram illustrating the initial generation of values for Table 24. Beginning at the START 26, variables n and i are set to 1 in steps 28 and 30. The variable n represents the number of times the entire Table has been calculated and i represents each user module antenna. In step 32 the reception of reference packets used for quality and signal strength determination is enabled on local antenna i. In step 34 parameter j is initialized to 1; j represents each node antennae. In step 36 the user module constructing the subject Table enables reception of a reference packet transmitted from node antenna j. Step 38 represents a time delay allowed for the user module to receive the reference packet from the node. In step 40 a decision is made as to whether a new reference packet has been received. If YES, the new rank R of the received reference packet is calculated in step 42. If NO, the new rank is set equal to WORST which represents the worst possible new ranking assignable to a cell. Such a value is assigned to represent an unusable antenna combination since the reference packet was not received at all. The historical rank for the particular user module antenna and node antenna combination is calculated at step 46. The historical rating HR for each of the cells is stored in memory and is used for selecting the user module and node antenna to be utilized as will be described below.

In step 48, variable j is incremented by 1 thereby selecting the next node antenna to be utilized. A decision is made by step 50 to determine if the value of j exceeds the actual number of node antennas. A YES determination indicates it is within the maximum number of node antennas and steps 36–48 are repeated utilizing the same local antenna i but new node antenna j. A NO determination by step 50 indicates that the UM has had the opportunity to receive a referenced packet transmitted from each of the node antennae, using the same local UM antenna and the user module antenna i is incremented by 1 in step 52. Decision step 54 determines if the value i is within the maximum number of user module antennas. If YES, steps 32–52 are repeated in which the i user module antenna receives reference packets from each of the node antennas j. A NO determination by step 54 means that each of the node antennas has transmitted to each of the user module antennas thereby completing a sample for each of the cells in Table 24. The variable n is then incremented by 1 in step 56. To avoid making an antenna decision based upon only one sample of each cell and to build a history of such cell values before making the initial antenna determination, decision step 58 determines if a sufficient number of samples of each of the cell values in Table 24 has occurred. If n has not yet achieved the required number of samples, a YES decision causes steps 30–56 to be reexecuted thereby generating another series of cell updates for the entire Table. A NO determination by step 58 represents that the predetermined number of Table samples has been reached. This series of steps terminates as indicated by transfer to "A" 60. The parameter n will vary depending upon the system configuration and the relative importance placed upon the historical significance of the values of each cell in Table 24. In the illustrative embodiment of the present invention, n is desirably greater than 10 and is preferably greater than 50 due to the emphasis on historical weighting.

Figure 5:
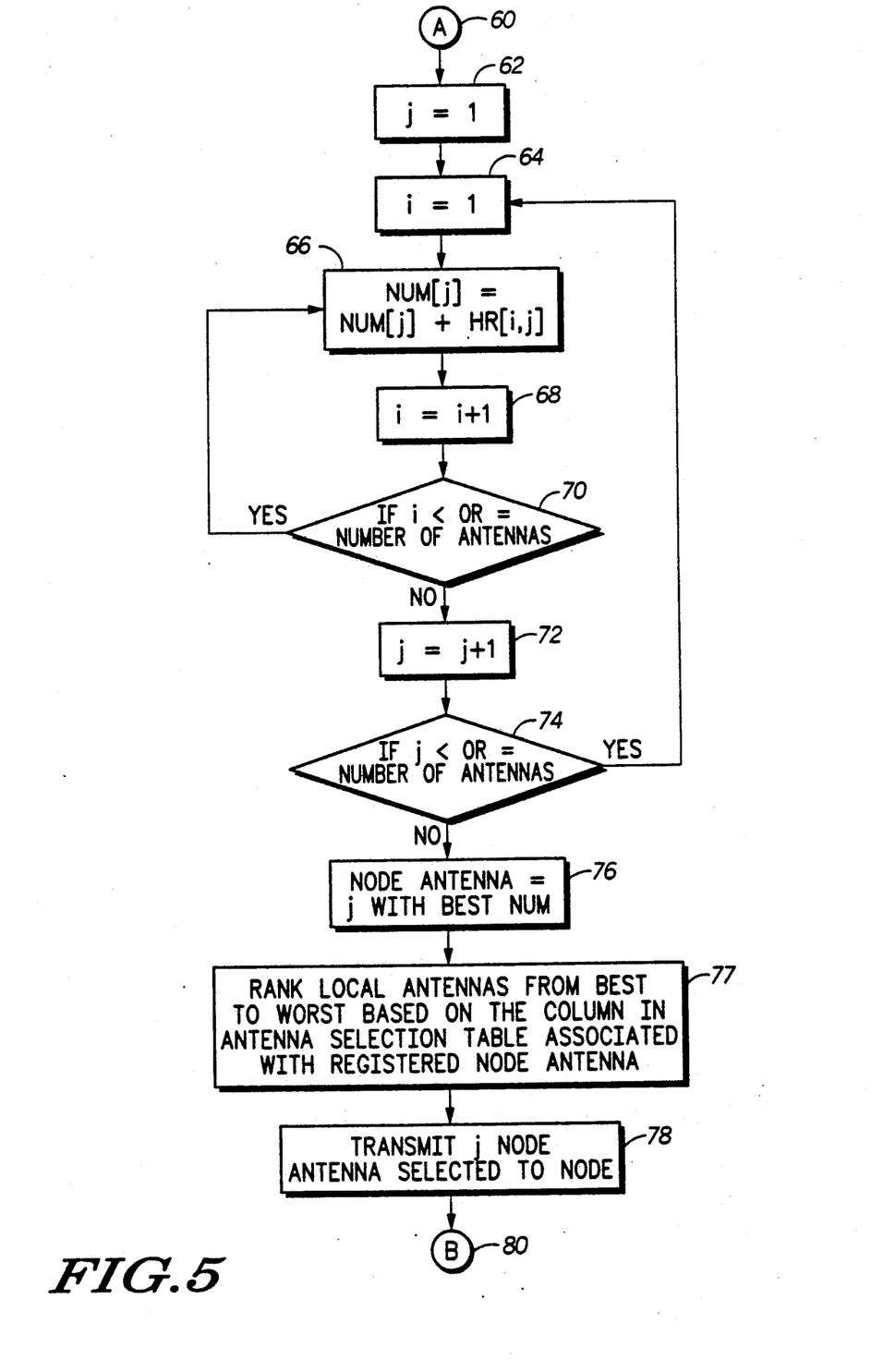
FIG. 5 is a flow diagram in accordance with an embodiment of the present invention for selecting the best performing antenna at a node.

FIG. 5 begins at entry point A 60 where variables j and i are each initialized to 1 representing node antenna 1j, UM antenna 1i at steps 62 and 64. Step 66 in combination with steps 68 and 70 generate a value equal to the sum of the values in column 1j. This column summation represents a composite value of the overall performance of each node antenna. Determination step 70 ceases looping back to step 66 when all of the values associated with each of the UM antennas has been summed for one node antenna. Step 72 selects the next node antenna to have a column summation of HR values. Decision step 74 causes the preceding process to continue thereby summing each of the columns representing node antenna values until all of the node antennas have a corresponding composite summation. A NO determination by decision step 74 indicates that all node antennas have summations that have been calculated. In step 76, the node antenna with the composite summation j of the BEST sum identifies the node antenna to be utilized for communication with the corresponding user module. Step 77 ranks the UM antennae from best to worst based on the column in Table 24 associated with the registered or used node antenna. In step 78 the user module transmits the j node antenna selected to the node by a packet from the user module to the node. Thus, the node now knows which of its antennas to assign when communicating with this particular user module. The steps end at point "B" 80.

These steps are carried out at each user module for each node with which it can communicate. Thus, a Table 24 will be calculated for each node that can be "seen" by a user module. Although each node does not maintain a Table 24, it maintains in memory the antenna assigned to it by each user module for communications.

Figure 6:
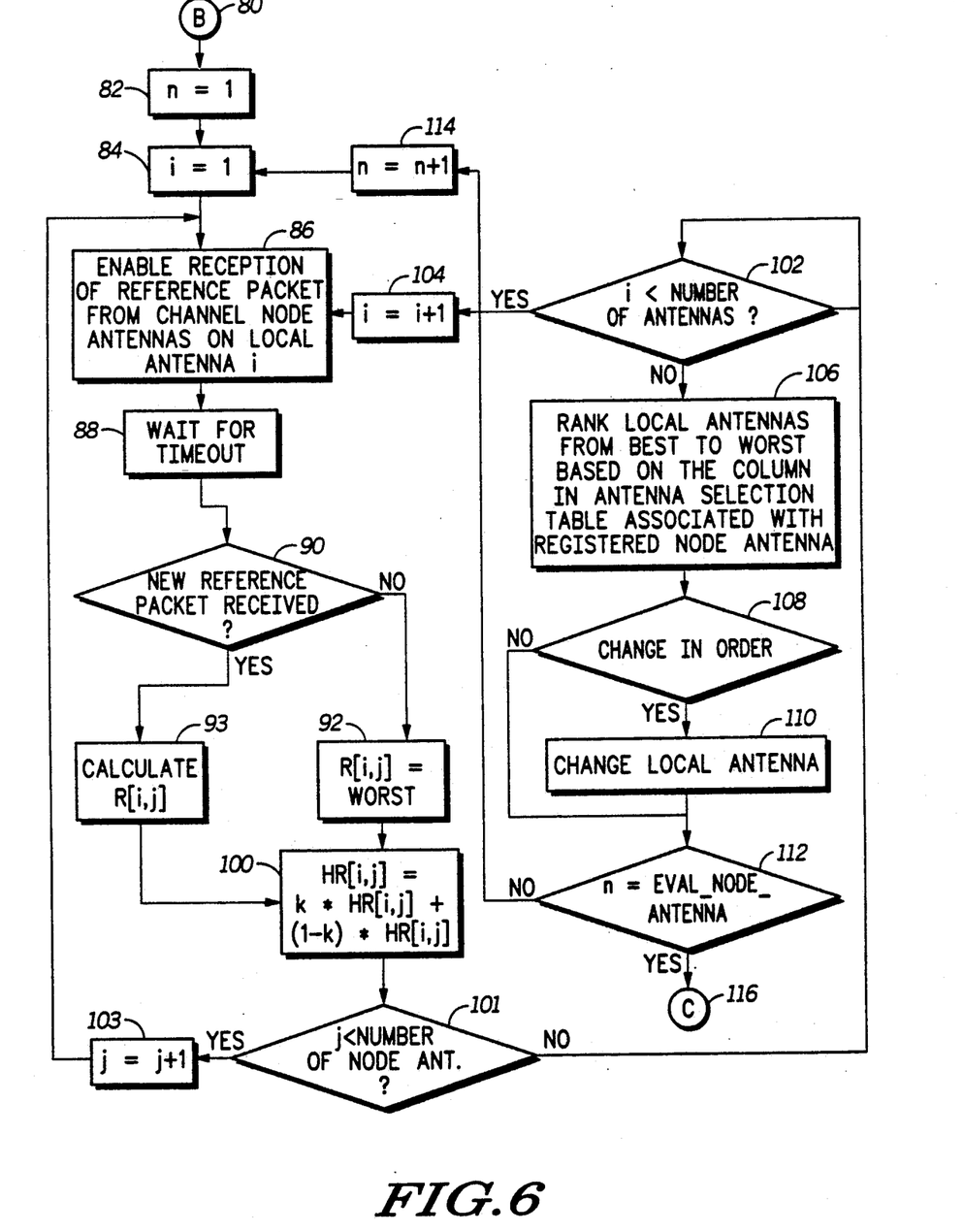
FIG. 6 is a flow diagram in accordance with an embodiment of the present invention illustrating a method for continuously updating and selecting the best antenna for use at a user module.

FIG. 6 is a flow diagram of an exemplary method in accordance with the present invention for determining and continuously re-evaluating the best user module antenna. Before beginning these steps at point "B" 80, values for each cell in Table 24 will have been calculated and a node antenna selected. Parameters n and i are initialized to 1 by steps 82 and 84. Parameters i and j refer to user module antennas and node antennas, respectively. Parameter n will be explained below.

The reception of reference packets from the chosen node antenna j on local antenna i is enabled at step 86. A time delay is introduced by step 88 to provide time for reception of the reference packet. Decision step 90 determines if a new reference packet was received. If NO, then the new rank R for the user module and node antenna combination is set equal to WORST, i.e. a very low rating value. Upon a YES decision by step 90 a new ranking is calculated by step 98. In step 100 the historical rank HR for the subject antenna combination is updated to reflect the latest new ranking.

Decision step 101 determines if all node antennae j have been sampled. If YES then step 103 increments j and steps 86–100 repeat for the new node antenna. If NO by step 101, then decision step 102 determines if any user module antennas remain to be evaluated in a cycle in which each of the antennas are evaluated. A YES decision indicating more antennas are to be evaluated, causes step 104 to increment the user module antenna parameter i and a subsequent re-evaluation for that antenna by steps 86–100. A NO decision by step 102 indicates that all antennas have been re-evaluated in a given cycle and the user module antennas are ranked from best to worst for the values in the column of Table 24 corresponding to the selected node antenna by step 106. The previous rankings for the user module antennae are maintained in memory. Decision step 108 determines if the latest ranking represents a change in order for the best rated user module antenna. If YES, the local antenna is changed to the current best rated antenna by step 110. Following a NO decision by step 108 or following action by step 110, decision step 112 determines if the parameter n equals a predetermined value. This predetermined value is selected such that the node antenna will be re-evaluated less frequently than the evaluation of the user module antennas. For example, if n=50, the node antennas would be re-evaluated only after the user module antennas have been re-evaluated 50 times. If the value of n has not yet reached this predetermined evaluation value, i.e. a NO decision by step 112, parameter n is incremented by step 114 and another cycle of user module antenna evaluations occur by steps 86–110. A YES decision by step 112 causes the node antenna to be re-evaluated by going to point "C" 116.

Figure 7:
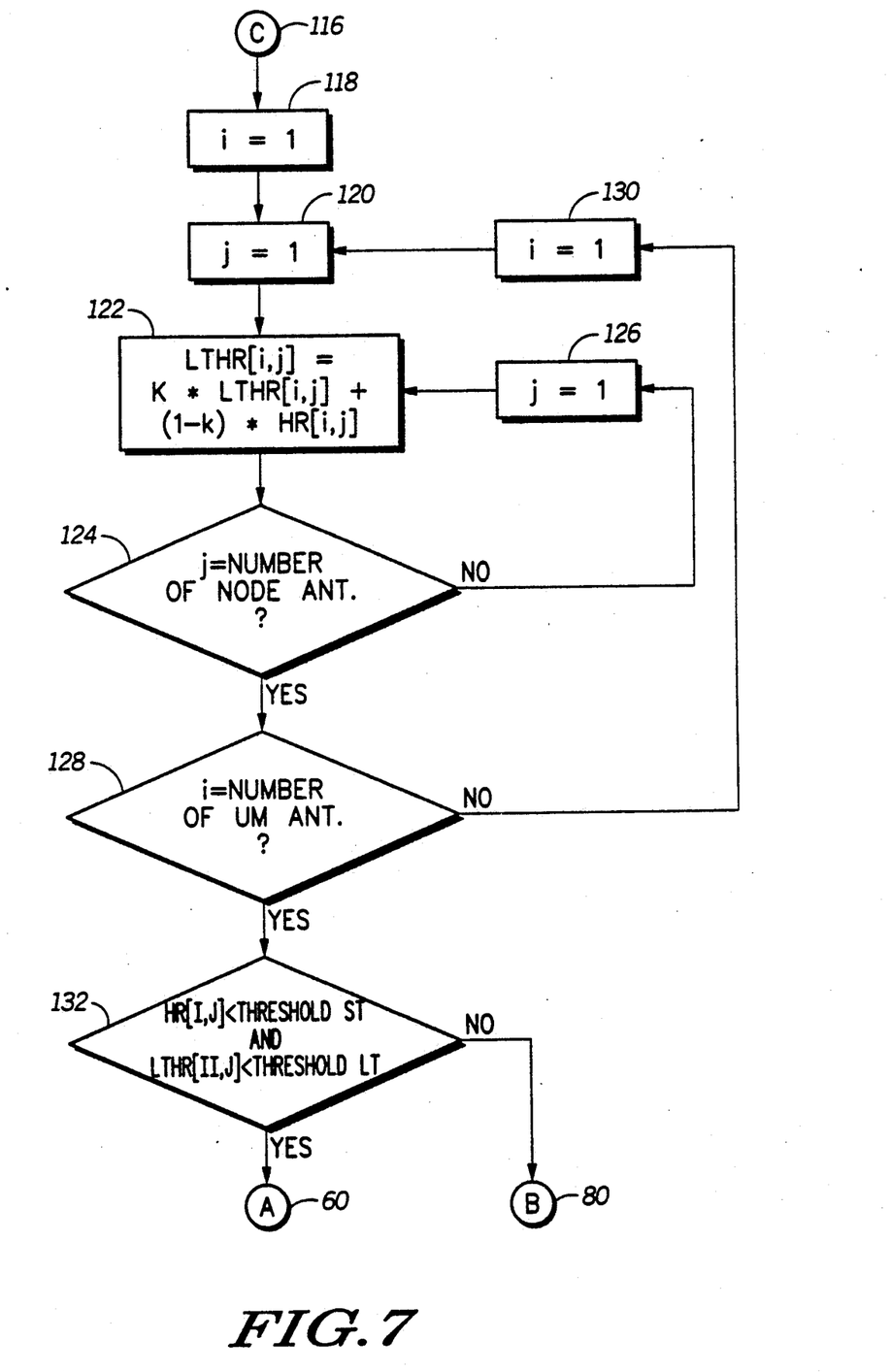
FIG. 7 is a flow diagram in accordance with an embodiment of the present invention illustrating a method for continuously evaluating and selecting the best antenna for use at a node.

FIG. 7 is a flow diagram of an illustrative embodiment of steps in accordance with the present invention by which the selected node antenna is continuously re-evaluated. Beginning at "C" 116, parameters i and j are initialized to 1 by steps 118 and 120. Step 122 calculates a long term historical rating (LTHR) which is calculated in a similar manner to the historical rating (HR) previously defined. In this calculation the weighting factor K may be selected to be different than the weighting factor k for HR. This calculation step creates another table similar to Table 24 having the same format as Table 24 but representing an even longer term average of the values in Table 24. This table is utilized to provide an even greater historical weighting to the evaluation of the node antenna to be utilized. It should be remembered that Table 24 will have been created and updated a number of times before the long term historical rating calculation in step 122 is made. Steps 124, 126, 128, and 130 combine with steps 120 and 122 to form a calculation nest by which each of the possible user module antennas and node antennas are re-evaluated for the long term historical rating table. A YES determination by step 128 represents that each of these calculations has been made. In step 132 a decision is made on whether the node antenna should be reselected. The decision criteria to cause a node antenna reselection (YES), requires that the historical rating for the selected user module and node antennae be less than a short term (ST) threshold and that the long term historical rating for a selected antenna combination be less than a long term (LT) threshold. It should be noted that both the HR and LTHR requirements must be met. In the reference to LTHR [II, J] the II refers to the best long term value for a UM antenna in the registered J node antenna column in the long term table. It will be appreciated that for a given node antenna, the best UM antenna i in the HR table may be different from the UM antenna II in the LTHR table. Different thresholds for each requirement can be selected to take into consideration the specific system configuration and environment. A YES determination by step 132 causes a return to point A60 and reselection of a node antenna. A NO determination, causes a return to point "B" 80 resulting in the continued re-evaluation of user module antennas.

It is believed to be apparent to those skilled in the art that the illustrative method relating to antenna pattern selection can be advantageously employed as part of an overall operating system utilized to control other parameters and communications in an RF communication system. This method or selected parts of this method may be integrated into a central control program and may be carried out as background operations as time permits relative to other uninterruptable or priority tasks. Once basic communications is established between a user module and node, the continuing re-evaluation of the proper antennas to be utilized may not be critical depending upon the operating environment.

In the illustrative embodiment, each user module contains a table 24 of values and a corresponding long term table of values for each node with which it can communicate. In the illustrative half-duplex communications systems shown in FIG. 1 it is believed advantageous to have the user modules make antenna selection determinations since such determinations can be carried out in parallel based upon a single transmission from a node. This method also facilitates the joining of a new user module into an existing system since the complexity relating to antenna selection is distributed among the user modules and not concentrated at the nodes.

One of the advantages of this invention is its ability to select the most appropriate antennae for use without requiring calibration of the RF transceivers. Selection of the antenna to be used is based on relative comparisons.

Although an embodiment of the present invention has been shown and illustrated in the drawings, the scope of the invention is defined by the claims which follow.

We claim:

1. A remote communications device capable of RF communication with a node comprising:
    means coupled to said remote device for selecting an antenna pattern from a plurality of directional antenna patterns that cover different geographic areas relative to the remote device;
    means for determining the quality ($Q$) of signals received from the node on each of said antenna patterns;
    means for determining the signal strength of (S) of signals received from the node on each of said antenna patterns;
    means for ranking each of said antenna patterns according to $R=(q*Q)+(s*S)$, where R is the rank, q and s are numerical weighting factors, wherein $q>0$ and $s>0$ and $q>10*S$, whereby the quality of the received signal is given greater weight than the signal strength; and
    means for generating a historical average rank for each of said antenna patterns according to $HRnew=(k*HRold)+((1-k)*R)$, where HRnew is the new historical average rank, HRold is the last calculated historical rank, and R is the rank for the antenna pattern, and $1>k>0$;
    said selecting means selecting the antenna pattern for use in communicating with the node based upon said historical average rankings.

2. The remote device according to claim 1 wherein $k>0.5$ thereby giving greater weight to the historical ranking and reducing the impact of each new ranking.

3. The remote device according to claim 1 wherein $k>0.9$ thereby giving greater weight to the historical ranking and reducing the impact of each new ranking.

4. The remote device according to claim 1 further comprising means for periodically generating new rankings R based on new determinations of quality (Q) and strength (S).

5. A radio frequency (RF) communications system including a node and at least one remote device capable of RF communication with the node comprising:
    means coupled to the remote device (RM) for selecting an RM antenna pattern from a plurality of directional antenna patterns that cover different geographic areas relative to the RM;
    means coupled to the node for selecting a node antenna pattern from a plurality of directional antenna patterns that cover different geographic areas relative to the node;
    means for generating a matrix of rankings of each remote device antenna pattern for each node antenna pattern based on signals communicated between the remote device and node, said rankings of remote device and node antenna patterns constituting rows and columns, respectively, in said matrix;
    means for summing the rankings in each column in said matrix to generate column summations;
    said node antenna pattern selecting means selecting the node antenna pattern corresponding to the larges column summation for use in communications with said remote device.

6. The system according to claim 5 wherein said means for generating a matrix of rankings includes:
   means for determining the quality (Q) of signals received from each node antenna pattern on each of said device antenna patterns;
   means for determining the strength (S) of the signals received from each node antenna pattern on each of said device antenna patterns;
   means for ranking each combination of antenna patterns according to $$R = (q*Q) + (s*S)$$

where R is the rank, q and s are numerical weighting factors.

7. The system according to claim 6 further comprising means for generating a historical average rank for each of said antenna patterns according to $HR_{new} = (k*HR_{old}) + ((1-k)*R)$, where $HR_{new}$ is the new historical average rank, $HR_{old}$ is the last calculated historical rank, and R is the rank for an antenna pattern, and $1 > k > 0$, said device selecting means selecting the antenna pattern for use in communicating with the node based on said historical average rank.

8. The system according to claim 6 wherein $q > 0$ and $s > 0$, and $q > 10*s$, whereby the quality of the received signal is given substantially greater weight than the strength of the signal.

9. The system according to claim 7 wherein $k > 0.5$ thereby giving greater weight to the historical ranking and reducing the impact of each new ranking.

10. The system according to claim 7 wherein $k > 0.9$ thereby giving greater weight to the historical ranking and reducing the impact of each new ranking.

11. The system according to claim 6 further comprising means for periodically generating new rankings R based on new determinations of quality (Q) and strength (S) for each matrix combination.

12. The system according to claim 5 further comprising said generating means and summing means both being part of said remote device, and means associated with said remote device means for transmitting a command to the node defining the node antenna pattern to use for communications with the remote device.

13. A method for choosing one antenna pattern from among a plurality of antenna patterns coupled to a remote communications device capable of RF communication with a node comprising:
   selecting an antenna pattern from a plurality of directional antenna patterns that cover different geographic areas relative to the remote device;
   determining the quality (Q) of the signals received from the node on each of said antenna patterns;
   determining the signal strength (S) of the signals received from the node on each of said antenna patterns;
   ranking each of said antenna patterns according to $R = (q*Q) + (s*S)$, where R is the rank, q and s are numerical weighting factors, wherein $q > 0$ and $s > 0$ and $q > 10*S$, whereby the quality of the received signal is given greater weight than the signal strength;
   generating a historical average rank for each of said antenna patterns according to $HRnew = (k*HRold) + ((1-k)*R)$, where HRnew is the new historical average rank, HRold is the last calculated historical rank, and R is the rank for the antenna pattern, and k is a weighting factor where $1 > k > 0$; and
   selecting the antenna pattern for use in communicating with the node based on the highest historical average rankings.

14. The method according to claim 13 wherein $k > 0.5$ thereby giving greater weight to the historical ranking and reducing the impact of each new ranking.

* * * * *